Figure 1:
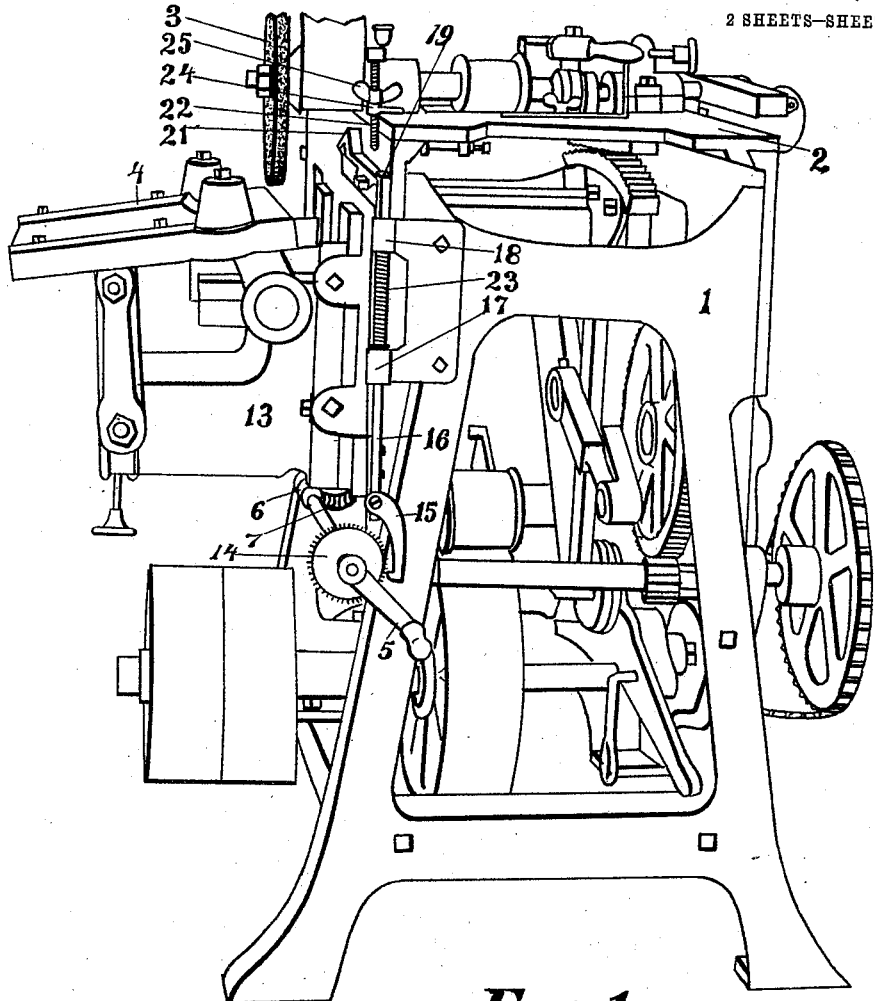

J. P. HEDSTROM.
AUTOMATIC FEED DEVICE FOR LAP GRINDING MACHINES.
APPLICATION FILED JUNE 15, 1912.

1,053,388.

Patented Feb. 18, 1913.

2 SHEETS—SHEET 1.

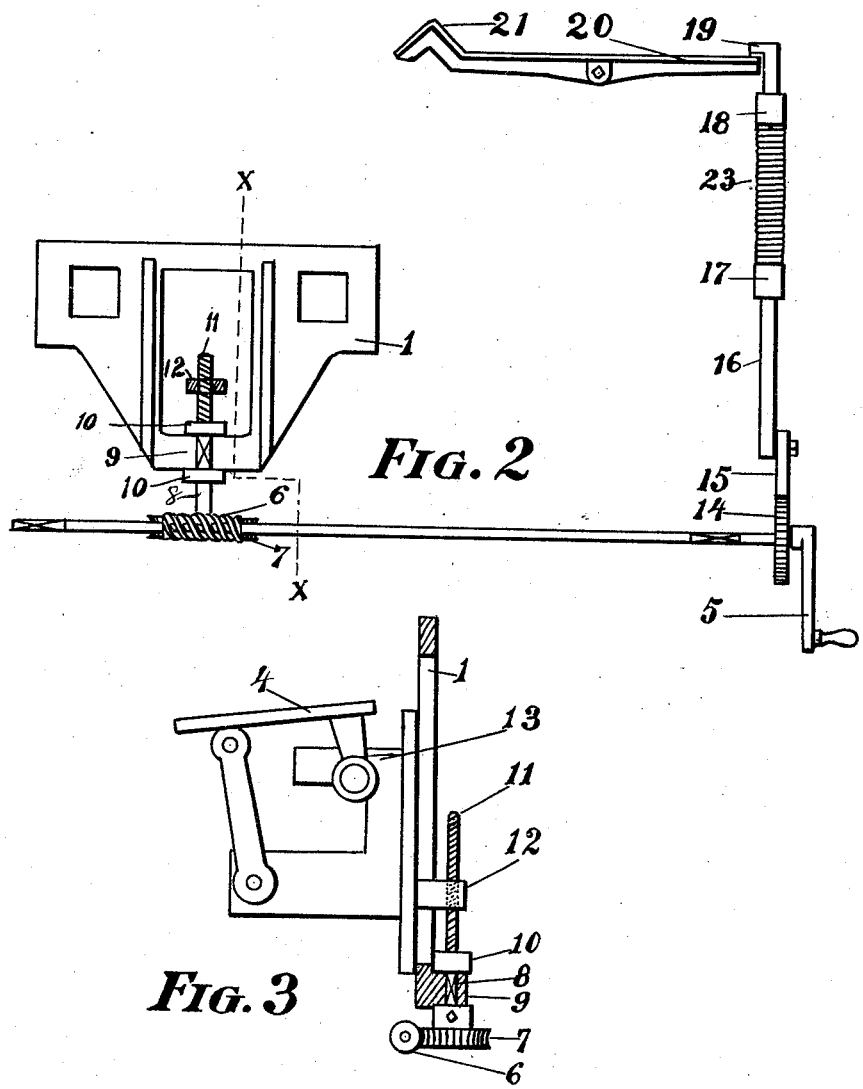

UNITED STATES PATENT OFFICE.

JOHN P. HEDSTROM, OF BIG RAPIDS, MICHIGAN.

AUTOMATIC FEED DEVICE FOR LAP-GRINDING MACHINES.

1,053,388.   Specification of Letters Patent.   Patented Feb. 18, 1913.

Application filed June 15, 1912. Serial No. 703,987.

*To all whom it may concern:*

Be it known that I, JOHN P. HEDSTROM, a citizen of the United States, residing at Big Rapids, in the county of Mecosta and State of Michigan, have invented certain new and useful Improvements in Automatic Feed Devices for Lap-Grinding Machines; and I do hereby declare the following to be a full, clear, and exact description of the invention, such as will enable others skilled in the art to which it appertains to make and use the same.

This invention is an improvement in lap grinding machines and pertains more particularly to automatic feed devices used in connection with machines for forming the beveled edges on band saws and similar work, preparatory to brazing the edges together.

The feeding device consists in means whereby the vertically movable table, to which the saw is clamped while being ground, may be automatically raised by a very small fraction of an inch as the grinding wheel traverses back and forth across the edge to be lapped.

Heretofore lap grinding machines have been provided with vertically movable tables, but the constant attendance of an operator was required in order to properly feed the work to the reciprocating grinding wheel.

It is the purpose of my present improvement to provide an automatic feed device that will gradually feed the work up to the grinding wheel by very small amounts, and to change the rate of feed without stopping the machine.

With these and certain other objects in view which will appear later in the specification, my improvement consists in certain devices and combinations to be set forth in the specification and pointed out in the claims, and the equivalents thereof.

In the drawings, Figure 1 is a perspective view of a lap grinding machine embodying my improvement; Fig. 2 is a detached detail of the feed mechanism; and Fig. 3 is a side elevation partly in section, on the line $x$—$x$ of Fig. 2, showing the feed table and the feed screw by which it is raised.

1 represents the frame of the machine upon which is mounted the reciprocating table 2 carrying a revoluble grinding wheel 3. Mounted upon the frame of the machine below the grinding wheel and vertically slidable on the frame is the clamping table 4 upon which the work is held in the usual manner. As ordinarily constructed, grinding machines of the class described are usually provided with a hand crank 5 operating a worm 6 which meshes with a worm wheel 7. The worm wheel is carried by a shaft 8 supported by means of a bearing 9 and collars 10 upon the frame of the machine. The upper part 11 of shaft 8 is preferably threaded into a lug 12 carried by the vertically sliding bracket 13 upon which the clamping table 4 is mounted. By turning crank 5, clamping table 4 may be raised and lowered to feed the work toward or draw it away from the grinding wheel 3.

Since the accuracy of the work depends to a considerable extent upon the slowness and care with which the grinding operation is executed, and since the hand feed just described is not sufficiently sensitive to produce the best results and in addition requires the constant attendance of the operator, I provide the following means for automatically raising the table 4 upon which the work is clamped. Upon the shaft of crank 5 I mount a fine toothed ratchet wheel 14 adapted to be engaged by the upward movement only of a suspended pawl 15, which is preferably hung so that its extremity normally engages the teeth of the ratchet wheel. The pawl is suspended from a vertically movable rod 16 slidably mounted in suitable bearings 17, 18 carried by the frame 1. The upper end of rod 16 is hooked, as shown at 19, and is adapted to be engaged by one end of a pivoted wiper 20 carried by the frame 1, when the opposite end of the wiper is depressed. This end of the wiper is provided with a raised part 21 adapted to be overridden by the end of a bolt or equivalent device 22 carried by the reciprocating table 2. The bolt 22 engages the raised part 21 of the wiper in both directions, that is, on both the forward and back stroke and at each passage of the bolt an upward movement is imparted to pawl 15 to turn the worm 6 and thereby lift the clamping table 4. When the bolt releases the raised part of the wiper, pawl 15 returns to its original position, being actuated by a compression spring 23 fixed at its lower end to rod 16 and having its upper end pressed against bearing 18. The bolt 22 is adjustable vertically with relation to table 2, being preferably threaded in the bracket 24 secured to table 2. A wing nut or equivalent locking device 25 is provided to lock the bolt 22 in its adjusted position. The amount of vertical movement imparted to pawl 15 and consequently the amount that table 4 is raised depends upon the amount of movement imparted to the pivoted wiper by the bolt 22. Hence raising the bolt will reduce the amount of upward feed of the table 4 and lowering it will increase the amount of feed for each passage of the grinding wheel 3 across the work.

While I have shown and described the preferred form of my invention as comprising a certain specific arrangement of tripping device, viz. the bolt 22 mounted on the carriage 2, and engaging a wiper carried by the frame, I do not desire to confine the scope of my invention to such specific arrangement, as any equivalent combination of tripping devices, one of which is carried by the table and the other by the frame may be substituted for the devices shown, without departing from the spirit of my invention.

By the means above described I have produced a simple, yet effective feed device for lap grinding machines that may be easily adjusted while the machine is in operation, one that is capable of extreme accuracy of adjustment, and is not liable to get out of order.

Having described my invention, what I claim and desire to secure by Letters Patent, is:—

1. In combination with a lap grinding machine having a reciprocating table and a clamping table capable of vertical movement, means for automatically feeding said clamping table upward, comprising an adjusting screw, a pivoted wiper adapted to be engaged by said screw and having a raised part at one end, a vertically movable rod adapted to be engaged by the opposite end of said wiper, a pawl pivoted to the lower end of said rod, a ratchet wheel engaged by said pawl, a worm actuated by said ratchet wheel, a worm wheel, and a screw secured to said worm wheel adapted to raise and lower said clamping table.

2. In combination with a lap grinding machine having a reciprocating table and a clamping table capable of vertical movement, means for automatically feeding said clamping table upward, comprising an adjusting screw carried by said reciprocating table, a pivoted wiper adapted to be engaged by said screw and having a raised part at one end, a vertically movable spring-pressed rod adapted to be engaged by the opposite end of said wiper carried by the frame of the machine, a pawl pivoted to the lower end of said rod, a ratchet wheel engaged by said pawl, a worm actuated by said ratchet wheel, a worm wheel, and a screw secured to said worm wheel, adapted to raise and lower said clamping table.

In testimony whereof, I affix my signature in presence of two witnesses.

JOHN P. HEDSTROM.

Witnesses:
CHRISTINE A. BRAIDEL,
GEO. W. SMITH.

---

Copies of this patent may be obtained for five cents each, by addressing the "Commissioner of Patents, Washington, D. C."